(12) United States Patent
Ikami

(10) Patent No.: US 6,330,054 B1
(45) Date of Patent: Dec. 11, 2001

(54) IMAGE-FORMING METHOD AND IMAGE-FORMING APPARATUS ON RECORDING MEDIUM INCLUDING MICROCAPSULES

(75) Inventor: Jun Ikami, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/407,980

(22) Filed: Sep. 29, 1999

(30) Foreign Application Priority Data

Sep. 30, 1998 (JP) .................................................. 10-276697

(51) Int. Cl.$^7$ .......................... G03B 27/00; G03G 15/08; G02B 26/00; G09G 3/34
(52) U.S. Cl. .......................... 355/400; 355/401; 355/402; 355/405; 430/91; 430/96; 430/106.6; 430/138; 430/151; 430/170; 359/296; 345/107
(58) Field of Search ..................................... 355/400, 401, 355/402, 405; 430/91, 96, 106.6, 139, 151, 170, 200; 359/296; 345/107

(56) References Cited

U.S. PATENT DOCUMENTS

| | | |
|---|---|---|
| 2,800,457 | 7/1957 | Green et al. . |
| 2,800,458 | 7/1957 | Green . |
| 4,293,634 * | 10/1981 | Monosov .............................. 430/269 |
| 5,776,364 * | 7/1998 | Niiyama et al. ................. 252/299.01 |
| 5,866,284 * | 2/1999 | Vincent .................................. 430/37 |
| 6,052,137 * | 4/2000 | Shimada ............................... 347/171 |
| 6,067,185 * | 5/2000 | Albert et al. .......................... 359/296 |

FOREIGN PATENT DOCUMENTS

| | | |
|---|---|---|
| 952807 | 3/1964 | (GB) . |
| 965074 | 7/1964 | (GB) . |
| 36-9168 | 6/1961 | (JP) . |
| 38-19574 | 9/1963 | (JP) . |
| 42-446 | 1/1967 | (JP) . |
| 42-771 | 1/1967 | (JP) . |
| 51-9079 | 1/1976 | (JP) . |

OTHER PUBLICATIONS

"An electrophoretic ink for all-printed reflective electronic displays" Barrett Comiskey et al; Nature; London; Jul. 16, 1998; vol. 394 pp. 253–255.*

* cited by examiner

Primary Examiner—Russell Adams
Assistant Examiner—Khaled Brown
(74) Attorney, Agent, or Firm—Oliff & Berridge PLC

(57) ABSTRACT

An image-forming apparatus forms an image by applying a control electric field having a polarity corresponding to recording information, to a recording medium having microcapsules including chargeable particles dispersed in a dispersion medium. The image-forming apparatus includes an alternating electric field-applying unit for applying an alternating electric field to the microcapsules. The alternating electric field is applied to the microcapsules of the recording medium before the image formed on the recording medium is rewritten. Accordingly, the chargeable particles are separated from the wall surfaces of the microcapsules and from the other chargeable particles, making it possible for the chargeable particles to perform free electrophoresis. The recording medium is initialized to improve the response performance with respect to the control electric field for forming a new image. The recording density is increased, and the blur is reduced.

20 Claims, 4 Drawing Sheets

IMAGE-FORMING METHOD AND IMAGE-FORMING APPARATUS ON RECORDING MEDIUM INCLUDING MICROCAPSULES

BACKGROUND OF THE INVENTION

1. Field of the Invention

The present invention relates to a method for forming an image on a recording medium based on the use of microcapsules including chargeable particles which are movable in a dispersion medium in accordance with an applied electric field. The present invention also relates to an image-forming apparatus for forming an image on the recording medium as described above.

2. Description of the Related Art

A variety of display systems have been hitherto known for displaying, for example, images and character information to effect visualization, including, for example, the CRT (Cathode Ray Tube) system as well as the liquid crystal system, the plasma light emission system, and the EL (electroluminescence) system.

In recent years, various electronic devices have been miniaturized in accordance with the rapid progress of the semiconductor technology. Accordingly, the display device is also required to realize, for example, a small size, a light weight, a low driving voltage, a small amount of electric power consumption, and a thin flat panel.

In response to the demand as described above, a variety of types of flat panel type electronic display devices have been suggested and practically used, including, for example, those of the light emission type represented by PDP (Plasma Display Panel) and those of the light-receiving type represented by LCD (Liquid Crystal Display). Especially, in recent years, the reflective type LCD has been vigorously studied in view of the fact that it consumes a small amount of electric power.

The reflective type LCD has, for example, the following merits. That is, it is possible to realize, for example, a small size, a light weight, a low driving voltage, a small amount of electric power consumption, and a thin flat panel. Further, the reflective type LCD easily conforms to the eye under an ordinary light source in the same manner as in printed matters, and it has a display quality involving no influence of external light.

However, even when the reflective type LCD is constructed by combining a guest-host liquid crystal with a TFT panel, it is merely possible theoretically to obtain an image having a reflectance of 66% and a contrast ratio of 5:1.

Such an image extremely resembles an image of newspaper having a reflectance of 57% and a contrast ratio of 5:1, and it is far from an image quality possessed by a calendar and an output image obtained by a laser printer having a reflectance of 80% and a contrast ratio of 21:1. A problem arises in that such an image is difficult to be seen.

Further, LCD has no memory function. For this reason, the image display cannot be maintained when the control electric field is cut off. It is necessary to continuously apply the stimulation such as an electric field to the display surface from the outside during the period in which the image is displayed. Therefore, LCD involves the problem in that it is difficult to be used, and it is disadvantageous in an economical viewpoint.

A first object of the present invention is to provide an image-forming method and an image-forming apparatus which has memory effect and excellent reflectance and contrast ratio.

A second object of the present invention is to provide an image-forming method and an image-forming apparatus which make it possible to avoid the decrease in recording density and the blur and realize appropriate rewriting when the recording information is rewritten on a recording medium including microcapsules.

SUMMARY OF THE INVENTION

According to a first aspect of the present invention, there is provided an image-forming method for forming an image on a recording medium including microcapsules containing chargeable particles dispersed in a dispersion medium in the microcapsules, the method comprising the steps of:

applying, to the recording medium, energy for dispersing the chargeable particles in the dispersion medium in the microcapsules before forming the image; and applying, to the recording medium, a control electric field having a polarity corresponding to recording information to electrophorese the chargeable particles in a predetermined direction in the microcapsules so that the image is formed thereby.

A recording medium is known, which is based on the use of microcapsules including chargeable particles dispersed in a dispersion medium in the microcapsules. A control electric field is applied in a specified direction to the microcapsules to electrophorese the chargeable particles in the specified direction. Accordingly, image information can be recorded (formed) on the recording medium. The chargeable particles are still localized at predetermined positions in the microcapsule even when the control electric field is cut off. Therefore, the recording medium has the so-called memory effect.

The present inventors have found out the following problem. That is, if there is a certain degree of time interval after the image information is recorded on the recording medium until the next recording (rewriting) is performed, then the chargeable particles in the microcapsule adhere to the wall surface of the microcapsule, or the chargeable particles cause mutual adhesion. As a result, the recording (display) density is lowered and any halation or blur occurs on the screen on which the next recording is performed.

According to the method of the present invention, the energy such as electric field is applied to the microcapsules of the recording medium before a new image is formed on the recording medium on which the image information has been once formed, i.e., before the image is rewritten. By doing so, the chargeable particles are separated from the wall surfaces of the microcapsules and from the other chargeable particles to enable the chargeable particles to perform free electrophoresis. Accordingly, the chargeable particles can be dispersed in the dispersion medium in the microcapsules. The response performance is improved with respect to the control electric field which is used when the image is rewritten. Further, the recording (display) density is increased, and the blur is reduced as well.

The energy may be energy necessary to freely electrophorese the chargeable particles localized in the microcapsules by means of the control electric field. The energy may be heat, electromagnetic wave, magnetic field, electric field, or ultrasonic wave. When the magnetic field, for example, an alternating magnetic field is used as the energy, magnetic fine particles may be contained in the chargeable particles.

In order to enhance the dispersion performance of the chargeable particles, it is desirable to use an alternating electric field as the electric field applied to the microcapsules. The voltage waveform for applying the alternating electric field may be a waveform selected from the group consisting of a rectangular wave, a sine wave, and a triangular wave. Especially, it is desirable to use the rectangular wave.

The recording medium may include a flexible sheet for coating the microcapsules thereon, and the chargeable particles may include particles to be positively charged in the dispersion medium and particles to be negatively charged in the dispersion medium. The chargeable particles may be composed of white particles and black particles. Alternatively, the chargeable particles may be composed of a group of color particles of the three primary colors.

According to a second aspect of the present invention, there is provided an image-forming apparatus for forming an image on a recording medium including microcapsules containing chargeable particles dispersed in a dispersion medium in the microcapsules, the apparatus comprising:

an alternating electric field-applying unit for applying an alternating electric field to the microcapsules; and a control electric field-applying unit for applying, to the microcapsules, a control electric field having a polarity corresponding to recording information.

The alternating electric field-applying unit of the image-forming apparatus according to the present invention makes it possible to allow the chargeable particles to perform free electrophoresis by separating the chargeable particles from the wall surfaces of microcapsules and from the other chargeable particles by applying the alternating electric field to the microcapsules of the recording medium. The recording medium can be initialized by dispersing the chargeable particles in the dispersion medium in the microcapsules before a new image is formed (written) on the recording medium on which the image information has been once formed. The initializing operation improves the response performance with respect to the control electric field for forming the new image. Further, the recording (display) density is increased, and the blur is reduced.

The apparatus may further comprise a transport unit for transporting the recording medium with respect to the control electric field-applying unit. In this embodiment, the alternating electric field-applying unit may be arranged upstream from the control electric field-applying unit in a transport direction of the transport unit. The alternating electric field-applying unit may comprise a pair of electric field-applying heads opposed to one another with the recording medium interposed therebetween, and an alternating voltage-generating unit.

In the apparatus, the control electric field-applying unit is capable of applying an alternating electric field before the control electric field is applied to the microcapsules, and thereby the control electric field-applying unit can function as the alternating electric field-applying unit. In this structure, the control electric field-applying unit may comprise a pair of electric field-applying heads opposed to each other with the recording medium interposed therebetween, and a control voltage-generating unit.

In the above aspect, the control electric field-applying unit may include a microcomputer for switching the electric fields described above. The microcomputer is capable of controlling the application of the electric fields so that the alternating electric field is applied to a predetermined recording position (image-forming position) of the recording medium to effect the initialization, and then the control electric field is applied to form a new image.

According to a third aspect of the present invention, there is provided an image-forming apparatus for forming an image on a recording medium including microcapsules containing chargeable particles dispersed in a dispersion medium in the microcapsules, the apparatus comprising:

a control electric field-applying unit for applying, to the microcapsules, a control electric field having a polarity corresponding to recording information;

a transport unit for transporting the recording medium with respect to the control electric field-applying unit; and a plurality of electric field-applying element pairs arranged opposingly so that the recording medium is interposed therebetween, the electric field-applying element pairs being arranged such that the electric field-applying element applies the electric field having a polarity which is different from a polarity of the electric field applied by the electric field-applying element disposed mutually adjacently in a transport direction.

The plurality of electric field-applying element pairs of the image-forming apparatus according to the fourth embodiment are arranged such that the electric field elements mutually adjoining in the transport direction apply the electric fields having the mutually different polarities. Therefore, the recording medium can be initialized in accordance with the transport of the recording medium in the same manner as in the application of the alternating electric field. The initializing operation improves the response performance with respect to the control electric field for forming the new image. Further, the recording (display) density is increased, and the blur is reduced.

According to a fourth aspect of the present invention, there is provided an image-forming apparatus for forming an image on a recording medium including microcapsules containing chargeable particles dispersed in a dispersion medium in the microcapsules, the apparatus comprising:

a means for applying, to the recording medium, energy for dispersing the chargeable particles in the dispersion medium in the microcapsules before forming the image; and a means for applying, to the recording medium, a control electric field having a polarity corresponding to recording information to electrophorese the chargeable particles in a predetermined direction in the microcapsules so that the image is formed thereby.

According to a fifth aspect of the present invention, there is provided an image-forming apparatus for forming an image on a recording medium including microcapsules containing chargeable particles dispersed in a dispersion medium in the microcapsules, the apparatus comprising:

an energy-applying unit for applying energy to the microcapsules of the recording medium; and a control electric field-applying unit for applying, to the recording medium, a control electric field having a polarity corresponding to recording information, wherein:

the chargeable particles are electrophoresed in a predetermined direction in the microcapsules to form the image on the recording medium in accordance with the control electric field applied by the control electric field-applying unit, and the energy is applied from the energy-applying unit to the microcapsules to disperse the chargeable particles in the dispersion medium in the microcapsules before the image on the recording medium is rewritten.

According to the fourth and fifth aspects of the present invention, the chargeable particles are separated from the wall surface of the microcapsules and from the other chargeable particles by applying the energy to the microcapsules for dispersing the chargeable particles in the dispersion medium in the microcapsules so that the chargeable particles may be freely electrophoresed. Accordingly, the chargeable particles can be dispersed in the dispersion medium in the microcapsules. The response performance is improved with respect to the control electric field when the image is rewritten. Further, the recording (display) density is increased, and the blur is reduced.

DESCRIPTION OF THE PREFERRED EMBODIMENTS

Embodiments of the display mechanism according to the present invention will be explained below with reference to the drawings.

The display medium used in the present invention includes a layer arranged with microcapsules which enclose two or more types of chargeable particles which are positively or negatively chargeable in a dispersion medium, and the dispersion medium for dispersing the chargeable particles. A control electric field is applied to the respective microcapsules included in the arranged layer. Thus, the display medium of the present invention is allowed to perform the predetermined display operation as a display element.

Figure 1:
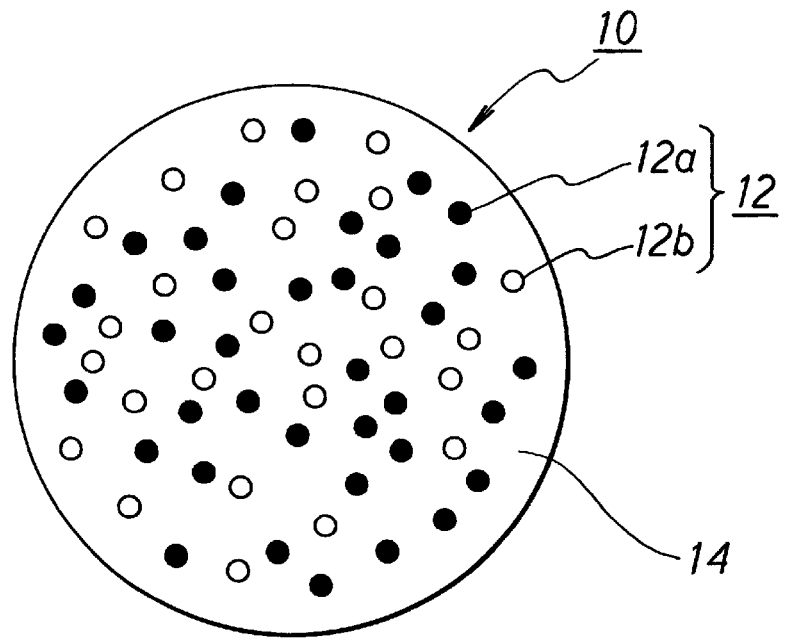
FIG. 1 schematically illustrates a microcapsule in a display medium which is dealt with by a display apparatus of the present invention.

FIG. 1 schematically illustrates an example of the microcapsule for constructing the display medium.

The microcapsule 10 is enclosed with a large number of chargeable particles 12 composed of black chargeable particles 12a and white chargeable particles 12b, and a liquid dispersion medium 14.

The color of the chargeable particle is not limited to the black and the white. The chargeable particle may have a variety of colors depending on the use or application thereof.

Usually, the chargeable particle 12 is composed of a coloring agent and a binder for fixing the coloring agent. However, the chargeable particle 12 may be composed of only the coloring agent. However, it is advantageous to use the binder in order that the chargeable particle 12 has the chargeable function.

The coloring agent includes, for example, generally well-known color colloid particles; various organic and inorganic pigments; dyes; metal powder; and pulverized fine powder of glass and resin.

The organic pigment is not specifically limited, including; for example, yellow pigments such as Hansa Yellow and Benzine Yellow; red pigments such as Parmanent Red and benzine orange; purple pigments such as rhodamine b lake and dioxazine violet; blue pigments such as victoria pure blue lake and victoria blue lake; green pigments such as diamonde green lake and phthalocyanine green; and black pigments such as diamond black.

The inorganic pigment is not specifically limited, including, for example, black pigments such as carbon black; and white pigments such as titanium oxide, aluminum oxide, zinc oxide, lead oxide, and tin oxide.

The inorganic pigment and the organic pigment described above may be used singly, or they may be used in combination of two or more compounds.

The dye is not specifically limited, including, for example, azo dyes, metal complex dyes, naphthol dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimido dyes, pennoline dyes, and phthalocyanine dyes.

The dye described above may be used singly, or it may be used in combination of two or more compounds.

When the dye is used as the coloring agent, the dye is required to have such a characteristic that it is dispersed in the binder for constructing the chargeable particle 12, and it is not dissolved in the dispersion medium 14. Further, the dye is required to have such a characteristic that no harmful effect is exerted on the chargeability of the chargeable particle 12.

The binder described above is used to dissolve or disperse, for example, the coloring agent and the inorganic substance, including, for example, wax and resin. When the coloring agent has no chargeability, a binder having the chargeability is used.

The wax is classified into synthetic wax composed of synthetic polymer and natural wax composed of natural material. The resin is classified into synthetic resin and natural resin.

The monomer component to be used for producing the wax or the synthetic resin includes, for example, methylacrylate, ethylacrylate, n-butylacrylate, i-butylacrylate, 2-ethylhexylacrylate, cyclohexylacrylate, tetrahydrofurylacrylate, methyl methacrylate, ethyl methacrylate, n-butyl methacrylate, i-butyl methacrylate, 2-ethyl hexyl methacrylate, stearyl methacrylate, lauryl methacrylate, methyl vinyl ether, ethyl vinyl ether, n-propyl vinyl ether, i-butyl vinyl ether, n-butyl vinyl ether, styrene, α-methylstyrene, acrylonitrile, methacrylonitrile, vinyl acetate, vinyl chloride, vinylidene chloride, vinyl fluoride, vinylidene fluoride, ethylene, propylene, isoprene, chloroprene, and butadiene.

The monomer component is preferably composed of a compound containing a functional group such as carboxyl group, hydroxyl group, methylol group, amino group, amide group, acid amide group, and glycidyl group. The use of the monomer containing the functional group as described above allows the synthesized resin or wax to be charged positively or negatively in the liquid dispersion medium 14 depending on the polarity of the functional group. For example, when the monomer containing amino group, amide group, or acid amide group is used, the binder is positively charged.

The natural wax described above includes, for example, plant wax such as candelilla wax and carnauba wax; animal wax such as bees wax, lanoline, and spermaceti; mineral wax such as montan wax, ozocerite, and ceresin; and petroleum wax such as paraffin wax, microcrystalline wax, and petroleum.

The natural resin described above includes, for example, sandarac, Manila copal, Peru balsam, tolu balsam, Arabian gum, cashew gum, zeol gum, gum ammoniac, jelutong, and cuticle gum.

The natural wax and the natural resin described above may be used singly, or they may be used in combination of two or more compounds.

The liquid dispersion medium 14 enclosed in the microcapsule 10 is required to have at least the high insulation performance and the colorless and transparent property. The liquid dispersion medium 14 having such characteristics includes, for example, aliphatic hydrocarbon solvent and aromatic hydrocarbon solvent.

A surfactant may be contained in the liquid dispersion medium 14 in order to obtain a good dispersion state of the chargeable particles 12.

The surfactant is classified, for example, into the anionic surfactant, the cationic surfactant, the ampholytic surfactant, and the nonionic surfactant depending on the type of the hydroxyl group bound to the hydrophobic group such as paraffin, olefin, and alkylbenzene. In the present invention, any of the surfactants described above can be used.

However, the amount of addition of the surfactant differs depending on the type and the structure of the surfactant. It is preferable that the surfactant is added within a range in which the insulation level of the insulative liquid dispersion medium 14 is not excessively lowered.

The microcapsule can be prepared in accordance with a method which has been the known technique in this field of the art.

For example, those available include, for example, the phase separation method from an aqueous solution as disclosed, for example, in U.S. Pat. Nos. 2,800,457 and 2,800,458; the interfacial polymerization method as disclosed, for example, in Japanese Patent Publication Nos. 38-19574, 42-446, and 42-771; the in-situ method based on monomer polymerization as disclosed, for example, in Japanese Patent Publication No. 36-9168 and Japanese Patent Application Laid-Open No. 51-9079; and the dissolution dispersion cooling method as disclosed in British Patent Nos. 952807 and 965074. However, there is no limitation thereto. The content of the published patent documents described above are incorporated herein by reference.

The material for forming the outer wall of the microcapsule 10 is not specifically limited provided that the material is usable to produce the outer wall by means of the method for producing the capsule described above. The material may be either inorganic or organic. However, it is preferable to use a material having such a quality that the light is sufficiently transmitted.

The material for forming the outer wall is specifically exemplified, for example, by gelatin, Arabian gum, starch, sodium alginate, polyvinyl alcohol, polyethylene, polyamide, polyester, polyurethane, polyurea, polyurethane, polystyrene, nitrocellulose, ethylcellulose, methylcellulose, melamine/formaldehyde resin, urea/formaldehyde resin, and copolymers thereof.

It is preferable that the volume of the respective chargeable particles 12 in the microcapsule 10 is 1.5 to 25% by volume with respect to the volume of the microcapsule 10 respectively. It is preferable that the total sum volume of all of the chargeable particles 12 is 1.5 to 50% by volume with respect to the volume of the microcapsule 10.

If the volume of each of the chargeable particles 12 is less than 1.5% by volume, the eye of the observer catches the particles having the opposite color which is not the objective display color. For this reason, the image is observed with lowered contrast. On the other hand, if the volume of the chargeable particle 12 exceeds 25% by volume, the chargeable particle 12 hardly moves in the microcapsule 10, because the chargeable particle 12 is too large.

If the total sum volume of all of the chargeable particles 12 is less than 1.5% by volume, the amount of the chargeable particles 12 is too small. As a result, no clear image is formed. on the other hand, if the total sum volume exceeds 50% by volume, the amount of the chargeable particles 12 is too large. Therefore, the chargeable particles 12 hardly move in the microcapsule 10. For this reason, the response performance is lowered with respect to the control electric field.

The particle diameter of the chargeable particle 12 is preferably $1/1000$ to $1/5$ with respect to the particle diameter of the microcapsule 10. The dispersion degree of the particle size distribution of the chargeable particles 12 is preferably 1 to 2 as represented by the volume average particle diameter/number average particle diameter.

The particle diameter of the microcapsule 10 is preferably 5 to 500 $\mu$m.

Next, explanation will be made for the operation effected when the electric field is applied to the microcapsule 10.

Figure 2:
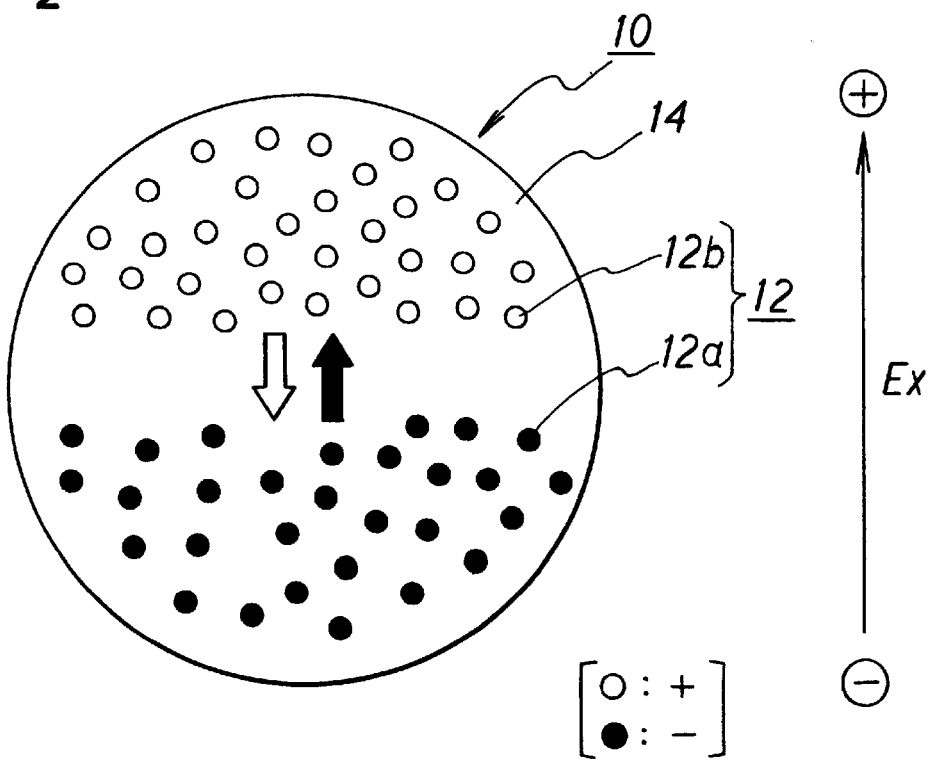
FIG. 2 schematically illustrates the states of black chargeable particles and white chargeable particles after an electric field is allowed to act on the microcapsule.

FIG. 2 schematically illustrates the states of the black chargeable particles 12a and the white chargeable particles 12b after the electric field is applied to the microcapsule 10. In this embodiment, it is assumed that the black chargeable particles 12a are negatively charged (−), and the white chargeable particles 12b are positively charged (+).

When the electric field is not exerted, the black chargeable particles 12a and the white chargeable particles 12b are dispersed randomly or in a disordered manner as shown in FIG. 1.

However, for example, when the voltage is applied to the liquid dispersion medium 14 containing the microcapsules 10, in a certain direction so that the upper part in FIG. 2 is positive (+) as shown in the drawing, the black chargeable particles 12a and the white chargeable particles 12b, which are dispersed to float in the liquid dispersion medium 14, are electrophoresed in the mutually opposite directions in accordance with the action of the electric field. For example, as shown in FIG. 2, the white chargeable particles 12b are gathered at the upper part (on the positive side) in the drawing, while the black chargeable particles 12a are gathered at the lower part (on the negative side).

Therefore, when the microcapsule 10 is viewed from a position disposed upwardly in FIG. 2, the black chargeable particles 12a, which are gathered on the lower side, cannot be seen because they are hidden by the white chargeable particles 12b. The portion of the microcapsule 10 is seen to be white.

On the other hand, although not shown in the drawing, when a voltage is applied in a direction opposite to that shown in FIG. 2, then the black chargeable particles 12a are gathered on the upper side, and the white chargeable particles 12b are gathered on the lower side. Therefore, the portion of the microcapsule 10 is seen to be white from the upward position.

Therefore, a predetermined image can be formed on the display surface by changing the direction of the electric field. An image including colors such as red, blue, and yellow colors can be also displayed by enclosing, in the microcapsule 10, chargeable particles 12 including colors such as red, blue, and yellow colors.

The image or the character, which has been once displayed, is maintained as it is even after the application of the voltage is stopped. Therefore, for example, the image or the character can be recorded without continuously applying the electric field.

However, when the electric field is applied to the chargeable particles 12 in the microcapsule 10, the force acts on the chargeable particles 12 in the direction indicated by the arrows in FIG. 2. The chargeable particles 12 are pushed against the wall surface of the microcapsule 10 and against the other chargeable particles 12.

Therefore, the chargeable particles 12 adhere to the wall surface of the microcapsule 10. Further, a large number of chargeable particles 10 adhere to one another to cause coagulation. The adhesive force becomes fairly strong in accordance with the passage of time. Even when the electric field is applied next time in order to effect the display, the response performance is deteriorated. As a result, the blur occurs in some cases.

In view of the above, in the present invention, the following pretreatment is performed before effecting the display. That is, an electric field is applied in order that the chargeable particles 12, which adhere to the wall surface of the microcapsule 10 or to the other chargeable particles 12, are separated from these adhesive matters to give a state in which the chargeable particles 12 are capable of free electrophoresis in the dispersion medium as shown in FIG. 1. After that, a control voltage is applied for the purpose of display.

The method for applying the electric field is not specifically limited provided that the chargeable particles 12, which adhere to the wall surface of the microcapsule 10 or to the other chargeable particles 12, are separated from these adhesive matters to give the state in which the chargeable particles 12 are capable of free electrophoresis in the dispersion medium. For example, it is preferable to use a method for applying an alternating electric field to the microcapsule 10.

The method for applying the alternating electric field is not specifically limited. Positive and negative pulse electric fields may be alternately applied, or an ordinary alternating current may be used. In order to form the random state of the particles as shown in FIG. 1, the frequency is preferably 0.5 to 10 Hz, and more preferably 1.5 to 5 Hz.

The intensity of the electric field is preferably not less than 20 v/mm, and more preferably not less than 40 V/mm.

It is unnecessary that the intensity of the electric field is constant. The electric field may be intermittent.

The waveform, which is used when the voltage is applied, is not specifically limited as well. For example, it is possible to use a sine wave, a rectangular wave, and a triangular wave.

The period of time for applying the alternating electric field is preferably about several seconds. However, the period of time can be made shorter than 1 second depending on, for example, the intensity of the electric field.

Figure 3:
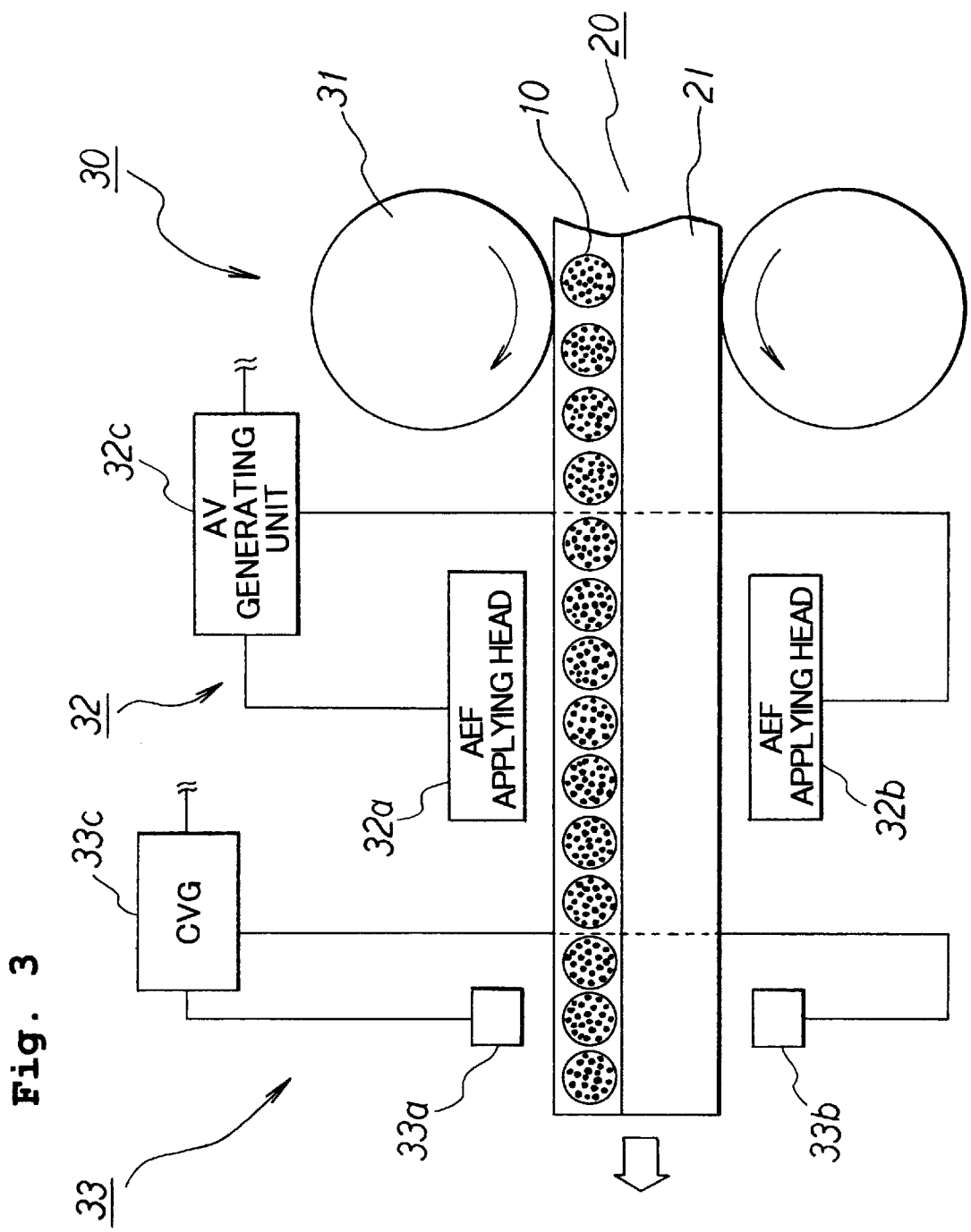
FIG. 3 shows a block diagram schematically illustrating an embodiment of the display apparatus of the present invention.

FIG. 3 shows a block diagram schematically illustrating an embodiment of the display apparatus according to the present invention.

The display apparatus 30 includes a display medium 20 composed of a layer arranged with microcapsules 10 coated by a coater on an upper surface of a flexible sheet 21 made of, for example, a resin film or a paper sheet. The display medium 20 is transported at a constant speed by means of a transport unit including transport rolls 31. Alternating electric field-applying heads (AEF APPLYING HEAD) 32a, 32b which construct an alternating electric field-applying unit 32 are provided at positions close to both surfaces of the display medium 20.

The alternating electric field-applying heads 32a, 32b are connected to an alternating voltage-generating unit (AV GENERATING UNIT) 32c. The alternating voltage-generating unit 32c includes an unillustrated microcomputer, making it possible to control the intensity and the frequency of the generated alternating voltage.

The alternating electric field-applying heads 32a, 32b may be constructed as follows. That is, the alternating electric field-applying heads 32a, 32b have approximately the same width as the lateral width of the display medium 20 to be transported, and they are capable of applying the alternating electric field at once to the lateral array of the display medium 20 to be transported. Alternatively, the alternating electric field-applying heads 32a, 32b may be constructed as follows. That is, the alternating electric field-applying heads 32a, 32b themselves have a small area, and the alternating electric field-applying heads 32a, 32b are capable of scanning in the vertical and lateral directions.

On the other hand, a printing head 33a (positive) and a printing head 33b (negative or grounded) for constructing a control electric field-applying unit 33 are provided on the left side of the alternating electric field-applying heads 32a, 32b. The printing heads 33a, 33b are disposed closely to the both surfaces of the display medium 20 as well. The printing heads 33a, 33b are connected to the a control voltage-generating unit (CVG) 33c.

The printing heads 33a, 33b may be line-shaped electrodes having approximately the same width as the lateral width of the display medium 20 to be transported. The line-shaped electrodes may be constructed such that the control electric field is applied differently for each of picture elements (image pixels) concerning the array in the lateral direction of the display medium 20 to be transported. Alternatively, the printing heads 33a, 33b may have a size approximately equivalent to the picture element or the microcapsule, and they are capable of scanning in the vertical and lateral directions.

Next, the operation of the display apparatus will be explained.

The display medium 20 is transported by the transport unit at the constant speed in the direction indicated by the arrow. At first, the display medium 20 passes through the space between the alternating electric field-applying heads 32a, 32b. During the passage, the alternating electric field having a certain frequency is applied to the alternating electric field-applying heads 32a, 32b. Accordingly, the chargeable particles 12 in the microcapsules 10 are agitated, and they are separated, for example, from the wall surfaces of the microcapsules 10. Thus, the chargeable particles 12 are actively electrophoresed.

The portion of the display medium 20, which has passed through the space between the alternating electric field-applying heads 32a, 32b, continuously passes through the space between the printing heads 33a, 33b, and it makes sensitive response to the control electric field applied from the printing heads 33a, 33b. Thus, a superior display image, which is excellent in contrast and which involves no blur, is formed on the display medium.

The display medium 20 passes through the space between the printing heads 33a, 33b, and the predetermined image is formed thereon. Even thereafter, even when no electric field or the like is exerted, the constant image is maintained on the display medium 20. A new image is formed when the display medium 20 passes through the space between the printing heads 33a, 33b again.

Figure 4:
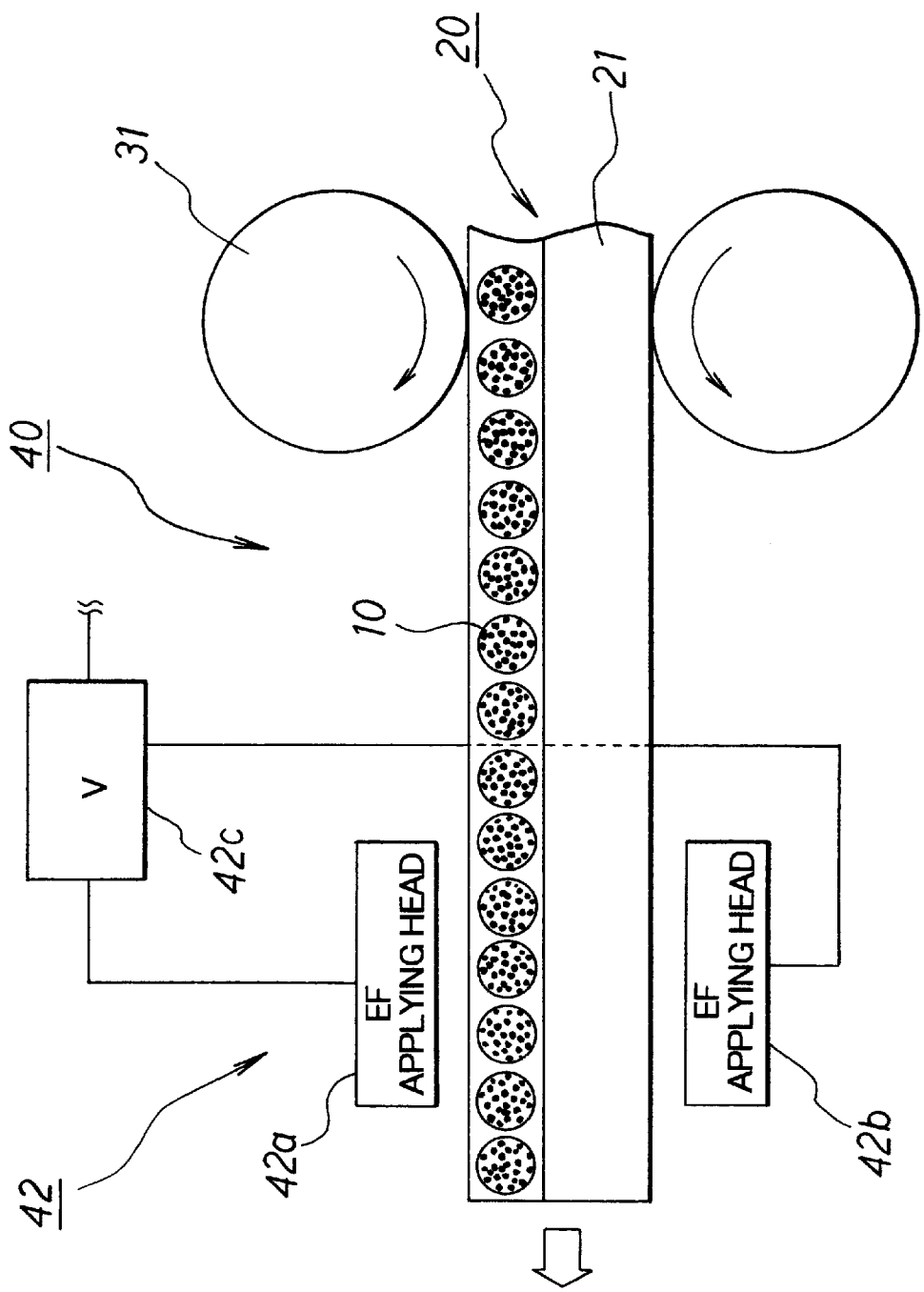
FIG. 4 shows a block diagram schematically illustrating another embodiment of the display apparatus of the present invention.

FIG. 4 shows a block diagram schematically illustrating another embodiment of the display apparatus according to the present invention.

In the display apparatus 40, the display medium 20 constructed in the same manner as that shown in FIG. 3 is transported at a constant speed by means of a transport unit. Electric field-applying heads (EF APPLYING HEAD) 42a, 42b which construct an electric field-applying unit 42 are provided at positions close to the both surfaces of the display medium 20.

The electric field-applying heads 42a, 42b are connected to a voltage-generating unit (V) 42c. The voltage-generating unit 42c is capable of generating both electric fields of an alternating electric field for the pretreatment and a control electric field for the display.

The display apparatus 40 is operated as follows.

The alternating electric field for the pretreatment is applied when the leading portion of the transported display medium 20 passes through the electric field-applying heads 42a, 42b. Subsequently, the control electric field for the display is immediately applied. Accordingly, an image is formed on the portion which has passed through the heads. After that, the same operation is repeated when the next portion of the display medium 20 arrives at the space between the electric field-applying heads 42a, 42b. In this embodiment, the transport speed of the display medium 20 can be decelerated, or the display medium 20 can be once stopped, if necessary.

When the leading portion of the display medium 20 is once stopped at the position after passing through the electric field-applying heads 42a, 42b, the transport is started again after the application of the alternating electric field and the application of the control electric field as described above. The transport is stopped again after the next portion arrives at the space between the electric field-applying heads 42a, 42b to perform the same operation as that described above.

A superior display image can be efficiently formed in accordance with the sequential processing system as described above.

Figure 5:
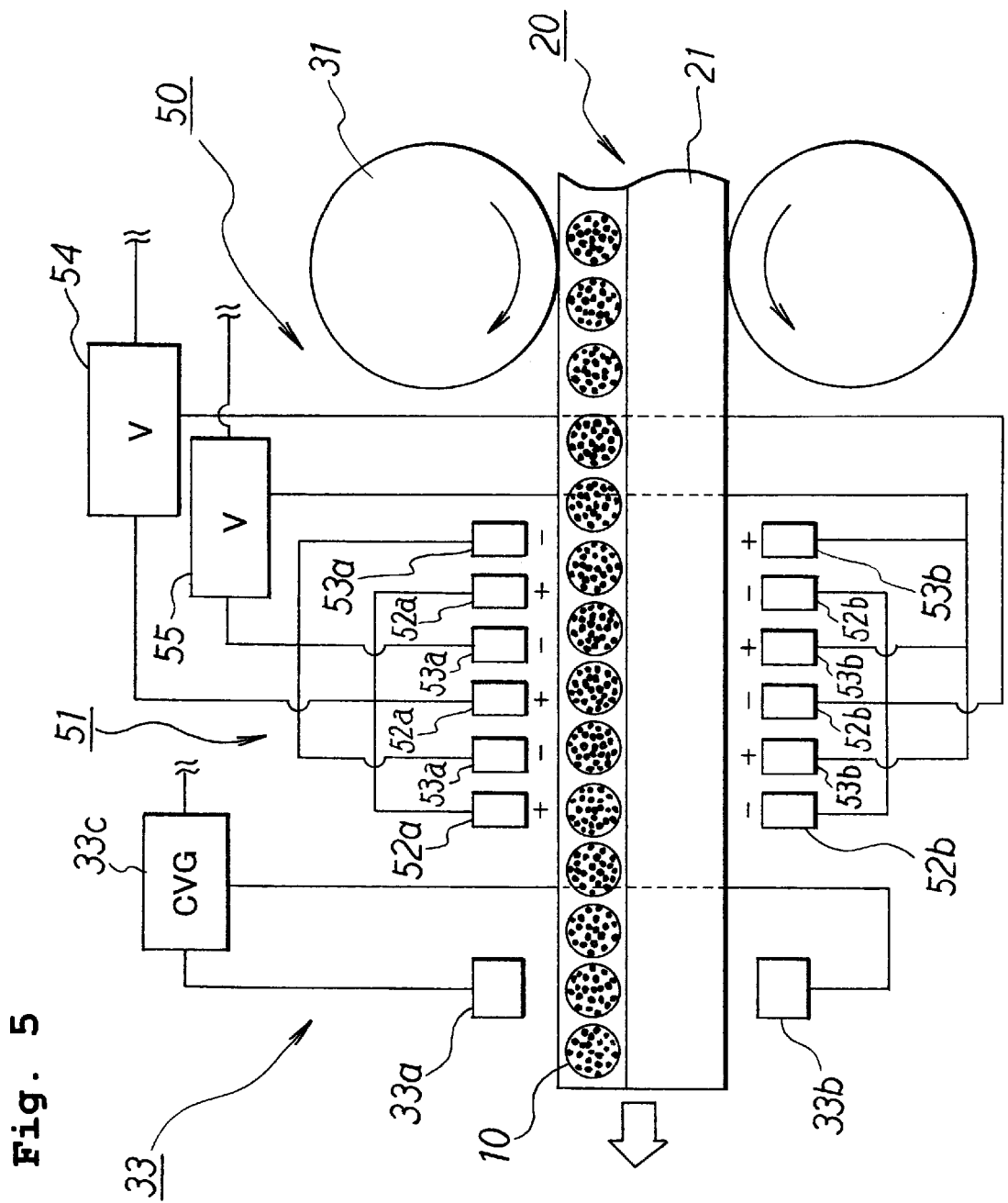
FIG. 5 shows a block diagram schematically illustrating still another embodiment of the display apparatus of the present invention.

FIG. 5 shows a block diagram schematically illustrating still another embodiment of the display apparatus according to the present invention.

In the display apparatus 50, the display medium 20 constructed in the same manner as that shown in FIG. 3 is transported at a constant speed by means of a transport unit constructed in the same manner as that shown in FIG. 3. Electric field-applying heads 52, 53 are provided at positions close to the both surfaces of the display medium 20. The electric field-applying heads 52, 53 are composed of assemblies of a large number of electric field-applying elements 52a, 52b, 53a, 53b, and they are constructed such that the individual electric field-applying elements 52a, 52b, 53a, 53b, which are disposed adjacent to one another, apply electric fields in mutually opposite directions.

The electric field-applying elements 52a, 52b, 53a, 53b are connected to voltage-generating units (V) 54, 55 respectively. The two voltage-generating units 54, 55 are capable of applying the electric fields in the mutually opposite positive and negative directions to the display medium 20.

An electric field-applying unit 51 is constructed by the electric field-applying heads 52, 53 and the voltage-generating units 54, 55.

On the other hand, printing heads 33a, 33b for constructing a control electric field-applying unit 33 are provided on the left side of the electric field-applying heads 52, 53, and they are disposed closely to the both surfaces of the display medium 20 as well. The printing heads 33a, 33b are connected to a control voltage-generating unit 33c.

Next, the operation of the display apparatus will be explained.

The display medium 20 is transported by the transport unit at a constant speed in the direction indicated by the arrow. At first, the display medium 20 passes through the space between the electric field-applying heads 52, 53. During the passage, an electric field, in which the upper part in the drawing is positive and the lower part is negative, is applied to the electric field-applying elements 52a, 52b. An electric field, in which the upper part is negative and the lower part is positive, is applied to the electric field-applying elements 53a, 53b. The display medium 20 is transported at the constant speed. Accordingly, an effect, which is equivalent to that obtained when the alternating electric field is applied, is exerted on the individual microcapsules 10. The chargeable particles 12 are separated, for example, from the wall surfaces of the microcapsules 10, and they are freely electrophoresed.

The portion of the display medium 20, which has passed through the space between the electric field-applying heads 52, 53, subsequently passes through the space between the printing heads 33a, 33b, and it sensitively responses to the control electric field applied from the printing heads 33a, 33b. Thus, a superior display image is formed on the display medium.

The present invention will be explained in further detail below with reference to Examples. However, the present invention is not limited to only these Examples.

EXAMPLES 1 TO 8 AND COMPARATIVE EXAMPLE 1

At first, a large number of chargeable particles were produced, i.e., white chargeable particles having an average particle diameter of about 7 $\mu$m composed of titanium oxide dispersed and fixed in polyamide resin, and black chargeable particles having an average particle diameter of about 7 $\mu$m composed of carbon black dispersed and fixed in polystyrene resin.

Subsequently, the chargeable particles produced by the method described above were added to 100 cc of an aqueous solution comprising, in a ratio of 1:1, an aqueous solution of 5% partial sodium salt of polystyrene sulfonic acid as an emulsifier and an aliphatic hydrocarbon solvent as a liquid dispersion medium, followed by agitation at 6000 rpm for 5 minutes with a homogenizer to obtain an emulsion comprising the liquid dispersion medium containing the white chargeable particles and the black chargeable particles uniformly dispersed in the aqueous solution.

Separately, a commercially available melamine powder was added to an aqueous solution of 37% formaldehyde, and pH was adjusted to be 9.0 with a sodium hydroxide solution, followed by being heated at a water temperature of 60° C. for 30 minutes to obtain melamine/formaldehyde prepolymer.

Subsequently, the melamine/formaldehyde prepolymer was added to the emulsion described above, which was maintained for 5 hours in a state of being heated so that the water temperature was 80° C. while making agitation at 100 to 300 rpm, for example, with an agitation homomixer. After that, pH was adjusted to be 7, followed by being cooled to the ordinary temperature.

As a result, the wall portion composed of the melamine/formaldehyde resin was deposited around the liquid dispersion medium containing the white chargeable particles and the black chargeable particles. Thus, the microcapsules encapsulating the chargeable particles were obtained. The microcapsules had an average particle diameter of 40 to 70 μm.

Subsequently, the microcapsules 10 produced by the method described above were extracted, and they were dispersed and applied with a coater on a flexible sheet 21. Thus, the display medium 20 was produced.

The electric field for the pretreatment was applied with the intensity and the frequency shown in Table 1 described below, to the display medium produced by the method described above, by using the display apparatus 30 shown in FIG. 3. After that, the control electric field was applied at an intensity of 100 V/mm to form an image. Subsequently, the image was evaluated as described below in accordance with the method as described below. Results of the evaluation are also described in Table 1 shown below.

Evaluation Method (1) White reflectance ($T_{white}$)

A reflection densitometer as a measuring instrument (produced by Macbeth, RD 914) was used to measure the OD value (optical density). The reflectance T (%) was calculated in accordance with an expression of $-\log_{10}T=$ OD.

(2) Black reflectance ($T_{black}$)

The reflectance $T_{black}$ was also measured for the black printed portion in the same manner as in the white reflectance. The contrast ratio is determined in accordance with an expression of 1: ($T_{white}/T_{black}$).

The black printed portion (8.9%) and the white printed portion (58.9%) of a newspaper sheet may be considered for a standard for the evaluation of image quality described above. Therefore, it is understood that Examples 1 to 6 achieve the reflectance at the same level as that of the newspaper sheet.

TABLE 1

| | Electric field intensity (V/mm) | Frequency (HZ) | White reflectance (%) | Black reflectance (%) |
| --- | --- | --- | --- | --- |
| Example 1 | 20 | 0.5 | 59.5 | 7.2 |
| Example 2 | 20 | 2.0 | 60.0 | 5.3 |
| Example 3 | 20 | 4.0 | 60.0 | 5.3 |
| Example 4 | 40 | 0.5 | 61.0 | 6.1 |
| Example 5 | 40 | 2.0 | 65.0 | 4.2 |
| Example 6 | 40 | 4.0 | 64.5 | 3.7 |
| Example 7 | 50 | 0.1 | 50.3 | 10.3 |
| Example 8 | 50 | 15 | 51.5 | 10.3 |
| Comparative Example 1 | 0 | 0 | 45.1 | 14.1 |

As clarified from the results shown in Table 1, when the alternating electric field for the pretreatment is applied by using the display apparatus according to the present invention, the image having the high reflectance and the high contrast ratio is formed. On the contrary, when the alternating electric field for the pretreatment is not applied, the contrast ratio is low. It is understood that the good result is obtained at the frequency of the alternating electric field of 0.5 to 4.0 Hz.

The present invention has been specifically explained with reference to the embodiments and Examples. However, the present invention is not limited thereto. In the embodiments described above, the rectangular wave is used as the voltage waveform for generating the alternating electric field. However, there is no limitation thereto. It is possible to use various waveforms such as a sine wave and a rectangular wave. However, it has been revealed from the experiment that the rectangular wave is most excellent in view of the response performance with respect to the control voltage.

In the embodiments described above, the alternating electric field is applied when the image information is rewritten. However, there is no limitation thereto. It is possible to apply any energy which makes it possible to randomly disperse the chargeable particles in the microcapsule. Those usable as the energy source include, for example, electric field, magnetic field, electromagnetic wave, heat, vibration, and ultrasonic wave. They may be used singly or in combination, and they may be used in combination with the electric field, especially with the alternating electric field.

When the magnetic field is applied as the energy, magnetic fine particles may be mixed with the chargeable particles. Alternatively, magnetic fine particles may be also used as a coloring agent. Those usable as the magnetic fine particles include, for example, iron (ferrite), cobalt, and rare earth element such as Tb. As for the means for applying the energy as described above, it is preferable to arrange, for example, an alternating magnetic field-applying head, an ultrasonic element, an electromagnetic wave generator, and a heating heater, in place of the alternating magnetic field-applying head.

What is claimed is:

1. An image-forming method for forming an image on a recording medium including microcapsules containing chargeable particles dispersed in a dispersion medium, the method comprising the steps of:

applying, to the recording medium, energy to freely electrophorese the chargeable particles for dispersing the chargeable particles in the dispersion medium in the mircocapsules before forming the image; and applying, to the recording medium, a control electric field having a polarity corresponding to recording information to electrophorese the chargeable particles in a predetermined direction in the microcapsules so that the image is formed thereby.

2. The image-forming method according to claim 1, wherein the energy is at least one selected from the group consisting of heat, electromagnetic wave, magnetic field, electric field, and ultrasonic wave.

3. The image-forming method according to claim 1, wherein the energy is electric field.

4. The image-forming method according to claim 3, wherein the electric field is an alternating electric field.

5. The image-forming method according to claim 4, wherein a voltage waveform for applying the alternating electric field is a waveform selected from the group consisting of a rectangular wave, a sine wave, and a triangular wave.

6. The image-forming method according to claim 4, wherein a voltage waveform for applying the alternating electric field is a rectangular wave.

7. The image-forming method according to claim 1, wherein the recording medium includes a flexible sheet for coating the microcapsules thereon, and the chargeable particles include particles to be positively charged in the dispersion medium and particles to be negatively charged in the dispersion medium.

8. The image-forming method according to claim 3, wherein the electric field is applied to the recording medium on which the image is once formed and on which image information is to be rewritten.

9. The image-forming method according to claim 1, further comprising the step of transporting the recording medium with respect to a position at which the control electric field is applied.

10. An image-forming apparatus for forming an image on a recording medium including microcapsules containing chargeable particles dispersed in a dispersion medium in the microcapsules, the apparatus comprising:

an alternating electric field-applying unit for applying an alternating electric field to the microcapsules to freely electrophorese the chargeable particles; and a control electric filed-applying unit for applying, to the microcapsules, a control electric field having a polarity corresponding to recording information.

11. The image-forming apparatus according to claim 10, further comprising a transport unit for transporting the recording medium with respect to the control electric field-applying unit, wherein the alternating electric field-applying unit is arranged upstream from the control electric field-applying unit in a transport direction of the transport unit.

12. The image-forming apparatus according to claim 10, wherein the alternating electric field-applying unit comprises a pair of electric field-applying heads opposed to each other with the recording medium interposed therebetween, and an alternating voltage-generating unit.

13. The image-forming apparatus according to claim 10, wherein the control electric field-applying unit is capable of applying an alternating electric field before the control electric field is applied to the microcapsules, and thereby the control electric field-applying unit functions as the alternating electric field-applying unit.

14. The image-forming apparatus according to claim 13, wherein the control electric field-applying unit comprises a pair of electric field-applying heads opposed to each other with the recording medium interposed therebetween, and a control voltage-generating unit.

15. The image-forming apparatus according to claim 14, further comprising a transport unit for transporting the recording medium with respect to the control electric field-applying unit.

16. An image-forming apparatus for forming an image on a recording medium including microcapsules containing chargeable particles dispersed in a dispersion medium in the microcapsules, the apparatus comprising:

a transport unit for transporting the recording medium with respect to the control electric field-applying unit; and a plurality of electric field-applying element pairs, to freely electrophorese the chargeable particles, arranged opposingly so that the recording medium is interposed therebetween, the electric field-applying element pairs being arranged such that the electric filed-applying element applies the electric field having a polarity which is different from a polarity of the electric field applied by the electric field-applying element disposed mutually adjacently in a transport direction.

17. The image-forming apparatus according to claim 16, wherein the plurality of electric field-applying element pairs are arranged upstream from the control electric field-applying unit in the transport direction of the transport unit.

18. An image-forming apparatus for forming an image on a recording medium including microcapsules containing chargeable particles dispersed in a dispersion medium in the microcapsules, the apparatus comprising:

a means for applying, to the recording medium, energy to freely electrophorese the chargeable particles for dispersing the chargeable particles in the dispersion medium in the microcapsules before forming the image; and a means for applying, to the recording medium, a control electric field having a polarity corresponding to recording information to electrophorese the chargeable particles in a predetermined direction in the microcapsules so that the image is formed thereby.

19. An image-forming apparatus for forming an image on a recording medium including microcapsules containing chargeable particles dispersed in a dispersion medium in the microcapsules, the apparatus comprising:

an energy-applying unit for applying energy to the microcapsules of the recording medium; and a control electric field-applying unit for applying, to the recording medium, a control electric field having a polarity corresponding to recording information, wherein:

the chargeable particles are electrophoresed in a predetermined direction in the microcapsules to form the image on the recording medium in accordance with the control electric filed applied by the control electric field-applying unit, and the energy is applied from the energy-applying unit to the microcapsules to freely electrophorese the chargeable particles and randomly disperse the chargeable particles in the dispersion medium in the microcapsules before the image on the recording medium is rewritten.

20. The image-forming apparatus according to claim 19, wherein the energy is at least one selected from the group consisting of heat, electromagnetic wave, magnetic field, electric field, and ultrasonic wave.

* * * * *